Figure 1:
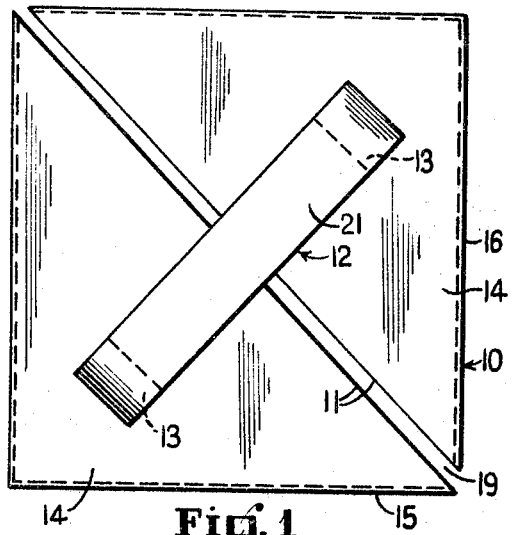

May 16, 1967 V. M. L. HALL 3,319,682
SANDWICH HOLDER
Filed Sept. 14, 1964

INVENTOR
Vera M. L. Hall.

3,319,682
SANDWICH HOLDER
Vera M. L. Hall, Box 739 A, Rte. 1,
Slidell, La. 70458
Filed Sept. 14, 1964, Ser. No. 396,111
2 Claims. (Cl. 146—150)

This invention relates to culinary, and more particularly to that one piece of culinary that is herein to be known as a sandwich holder.

While all kinds of useful devices have been devised and marketed for easing one's work in the kitchen, so far as it is known, no one has before this instant invented anything with which to hold a sandwich while cutting the same in half.

It is therefore the principal object of this invention to provide a kitchen utensil in the form of a sandwich holder that will permit one to hold a sandwich without actually touching it with one's hands while cutting the same in half.

Another object of this invention is to provide a sandwich holder that will permit one to evenly cut any number of sandwiches exactly the same size.

Another object of this invention is to provide a sandwich holder that will permit one to cut hot toasted sandwiches without having to wait for them to cool.

Another object of this invention is to provide a sandwich holder that will permit one to cut any sandwich in half or even in quarters no matter what the sandwich may contain.

Still another object of this invention is to provide a sandwich holder that is not only an unbreakable utensil, but also one that can easily be completely washed and dried in a minimum of time, and is therefore of great value in any restaurant kitchen where utensils are handled with speed by help having a minimum of experience, utensils that must be kept clean at all times.

Figure 3:
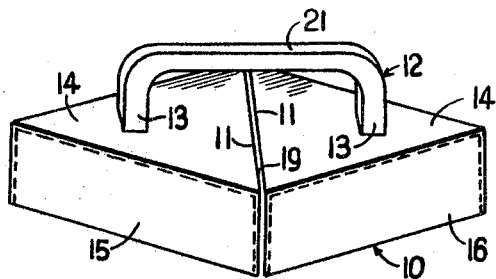
Figure 2:
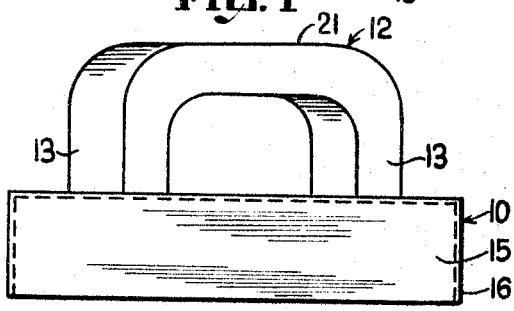
Figure 4:
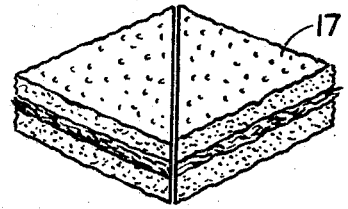
Figure 5:
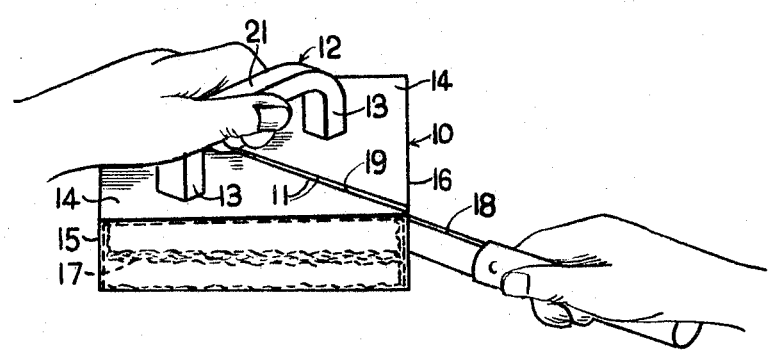

The invention is fully disclosed in the following specification, of which the accompanying drawing forms a part, in which the separate parts of my improvement are designated by suitable reference characters in each of the views, and in which:

FIGURE 1 is a top view of this invention.
FIGURE 2 is a side view of this invention.
FIGURE 3 is a pictorial view of this invention.
FIGURE 4 is a pictorial view of a typical sandwich after being cut in two with the use of this invention.
FIGURE 5 is a pictorial view of this invention in actual use.

Looking at the accompanying drawing it will be seen that this invention consists of two members 10 each one of which is identical to the other, and each one of which appears as a right triangle when viewed from the top and both of which are secured together in parallel spaced relation to the hypotenuse 11 of one another by an inverted U-shaped handle 12 that has the ends of its vertical legs 13 secured to the top 14 of each member 10.

Each member 10 consists of the aforesaid top 14 and two side members 15 and 16 that are at right angle to one another. Each member 10 is preferably made of a normally stainless sheet-metal of a size that will fit over the sandwich 17 which is shown to be cut diagonally in half in FIGURE 4 of the drawing.

The way in which this sandwich holder is used is as follows. The utensil is placed down over the sandwich 17 and any suitable kitchen knife 18 is taken in hand and placed under the inverted U-shaped handle 12 and in the opening 19 that is slightly greater in width than is the thickness of the blade of the aforesaid knife 18. The opening 19, of course, separates the hypotenuse 11 of the two members 10 of this invention. The sandwich holder is held firmly in place over the sandwich 17 by one's left hand being placed on the horizontal portion 21 of the aforesaid inverted U-shaped handle 12 as one can see by looking at FIGURE 5 of the drawing. The knife 18 is now moved in a cut that will separate the sandwich in the two desired halves as shown in the already mentioned FIGURE 5 of the drawing.

It is to be understood that while this invention illustrates a sandwich holder that is approximately square when viewed from the top, and one in which the sandwich is diagonally cut in half, the utensil is not at all limited to this shape. The invention may be produced to permit one to cut the sandwich in any way one desires. The utensil may also be produced with sides of a height that will permit the device to be used on sandwiches having more than two slices of bread. The device can be produced with any desired type of handle and can also be manufactured from any desired material.

What I now claim as new and desire to protect by Letters Patent in the United States is:

1. A sandwich holder of the character described, comprising two identical members each having a flat top, a hypotenuse and downwardly extending sides, each member appearing as a right triangle when viewed from the top, said members arranged with their tops in the same plane and with their hypotenuse in parallel spaced relation to one another, a single handle, means securing said handle to both members to retain said arrangement, the said two members being adapted to fit down over a sandwich which is now cut in two separate parts by a knife inserted in the space between the said two separate parts of the said sandwich holder.

2. A sandwich holder of the character described, comprising two identical members each said member of which consists of a flat top, a hypotenuse and vertical downwardly extending sides that are of the same depth as that of the thickness of a sandwich, and each one of the said members appearing as a right triangle when viewed from the top, said members arranged with their top in the same plane and with their hypotenuse in parallel spaced relation to one another, a single inverted U-shaped handle secured to both members, the said two members being adapted to fit down over a sandwich which is now cut in two separate parts by a knife inserted in the space between the said two separate parts of the said sandwich holder.

References Cited by the Examiner
UNITED STATES PATENTS

| | | | |
|---|---|---|---|
| 1,729,624 | 10/1929 | Meier | 146—150 X |
| 2,057,250 | 10/1936 | Sanger | 146—150 |
| 2,277,888 | 3/1942 | Segal | 146—150 |
| 2,652,087 | 9/1953 | Turpin | 146—150 |
| 2,925,110 | 2/1960 | Bayers | 146—150 |

WILLIAM W. DYER, Jr., *Primary Examiner.*
W. GRAYDON ABERCROMBIE, *Examiner.*